No. 729,471. Patented May 26, 1903.

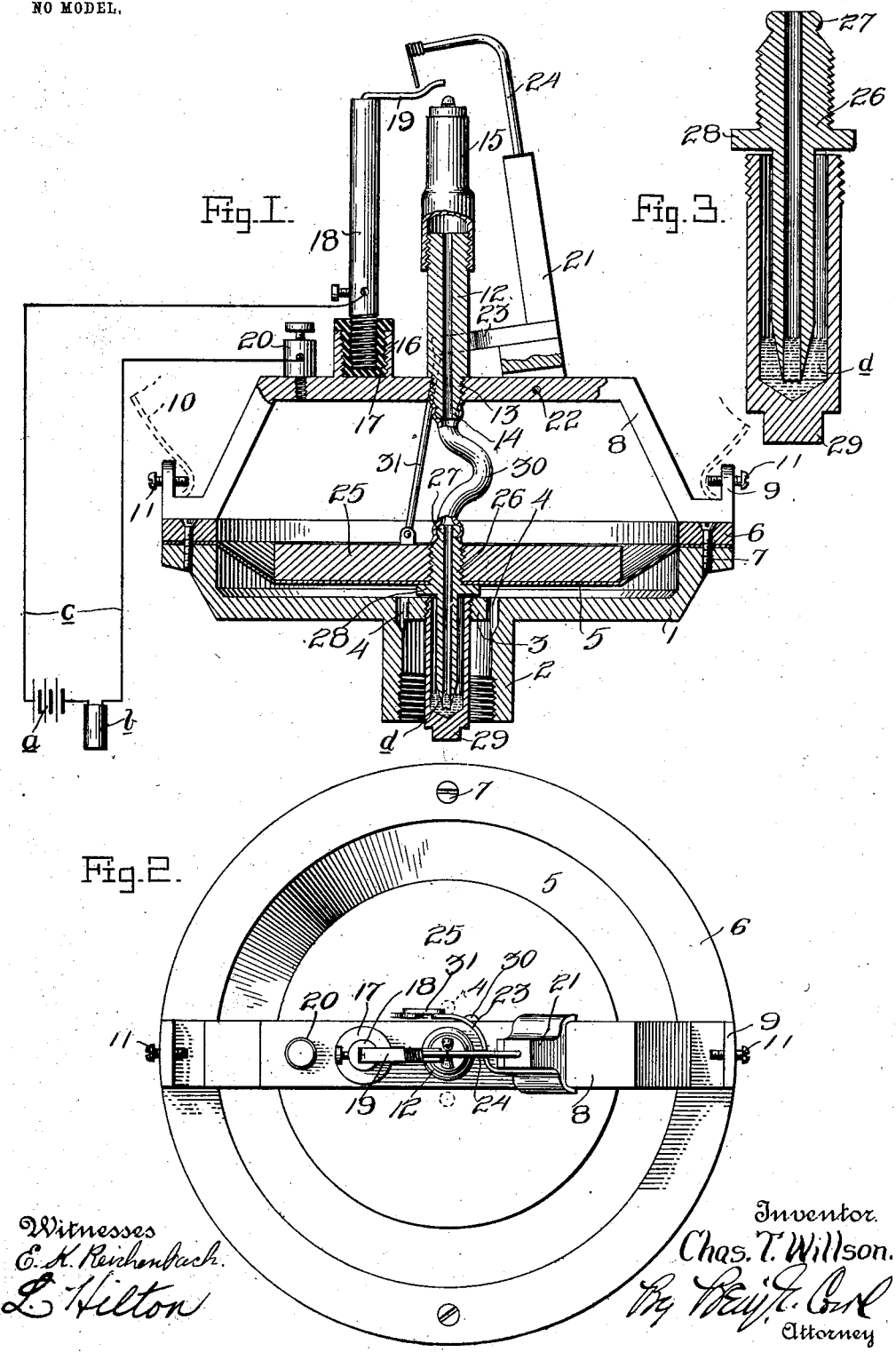

UNITED STATES PATENT OFFICE.

CHARLES THERON WILLSON, OF AMENIA, NEW YORK.

GAS-BURNER AND SELF-IGNITER.

SPECIFICATION forming part of Letters Patent No. 729,471, dated May 26, 1903.

Application filed February 9, 1903. Serial No. 142,499. (No model.)

*To all whom it may concern:*

Be it known that I, CHARLES THERON WILLSON, a citizen of the United States, residing at Amenia, in the county of Dutchess and State of New York, have invented certain new and useful Improvements in Gas-Burners and Self-Igniters, of which the following is a specification.

My invention relates to improvements in self-igniting gas-burners; and it consists in the construction and combination of devices hereinafter described and claimed.

One object of my invention is to effect improvements in the construction of the valve which controls the admission of gas to the burner.

A further object of my invention is to combine one element of the gas-controlling valve with an element which is automatically operated by the gas-pressure to automatically regulate the flow of gas to the burner and to cause the gas to be instantly ignited when the same is turned on.

In the accompanying drawings, Figure 1 is a vertical sectional view of a self-igniting gas-burner, illustrating one embodiment of my invention. Fig. 2 is a top plan view of the same. Fig. 3 is a detail sectional view of the liquid-container and movable tubular element which constitute the gas-valve.

In the embodiment of my invention I provide a gas-receiver, which is here shown as a cup 1, having a nipple 2 centrally disposed in its lower side and adapted to be coupled to a gas-pipe. The inner end of the nipple is closed by the central portion 3 of the bottom of the cup 1, and the said central portion is provided with gas-passages 4. On the upper side of the cup is a diaphragm 5, which may be made of leather, rubber, or other suitable material and which constitutes an element movable in one direction by gas-pressure in the gas-receiver. The said diaphragm is here shown as secured on the upper edge of the cup 1 by a ring 6, which is clamped to the cup by screws 7, the outer edge of the diaphragm being compressed between the upper edge of the cup and the lower side of the said ring. Across the center of the latter is a bridge-bar 8, which is disposed on its upper side. The ring 6 is in practice provided also on its upper side with upstanding lugs 9 to engage the lower side of a suitable globe 10, which is indicated in dotted lines in Fig. 1, the said lugs being provided with the usual screws 11 to secure the globe in place.

A tube 12 projects upwardly from the center of the bridge-bar 8 and has its lower end reduced to form a screw-threaded nipple 13, which is engaged with a threaded opening in the center of the bridge-bar, the extreme lower end of the said screw-threaded nipple being provided with a flange-head 14. To the upper end of the said tube 12 is attached a burner-tip 15, which may be of any suitable construction. The bridge-bar is further provided at a suitable distance to one side of the tube 12 with an internally-threaded lug 16, in which is fitted an insulating sleeve or bushing 17. In the latter is fitted the lower end of a detachable conducting-post 18, which is provided at its upper end with a detachable electrode 19, which extends at its outer end over or in proximity to the jet-orifice of the jet-tip 15. A binding-post 20 is electrically connected to the bridge-bar 8, which is a conductor. A rocking post 21 is pivotally and also electrically connected to the bridge-bar 8, as at 22, and is provided with a rock-arm 23. The said rocking post 21, which is an electrical conductor, is provided with a detachable electrode 24, which is carried thereby and moves therewith and is adapted to coact with the electrode 19 to make and break the electric circuit, including a battery $a$ and a spark-coil $b$, the conducting-wires being indicated at $c$.

On the diaphragm is a weight 25. The same is here shown as secured to the diaphragm by the movable tubular member 26 of the gas-valve, the upper end of the said movable tubular member being screw-threaded, engaged with, and passing through an opening in the center of the diaphragm and a threaded opening in the center of the weight and having its upper end provided with a flange-head 27. The said tubular member of the valve is further provided with a flange 28, which bears against the under side of the diaphragm, and the extreme lower end of the said movable tubular member of the valve is here shown as tapered. The said tubular movable member of the valve is disposed and vertically movable in the member 29 of the valve, said member constituting a cup-like element adapted to contain a liquid, mercury being a suitable material, and the same coacting with the tubular movable member 26 to form a seal when the said member 26 is in the lowered position shown in Fig. 1 and completely cut off the supply of gas to the burner. The liquid in the containing element 29, forming the trap or seal, is indicated at $d$. The upper end of the element 29 is secured in a threaded opening in the center of the bottom of the cup 1 and within the nipple 2.

A flexible gas-conducting tube 30, which may be made of rubber or any other suitable material, has its ends connected to the flange-heads 14 27 of the tube 12 and movable member of the gas-valve and serves to conduct gas from the gas-receiver to the burner when the pressure in the gas-receiver is such as to move the diaphragm 5 and the weight 25 thereon upwardly.

A link-rod 31 is pivotally connected to the weight and to the arm 23 of the rocking post 21 and communicates the motion of the diaphragm to the post 21, thereby causing the electrodes to produce an electric spark when the diaphragm rises, and thereby igniting the gas.

I do not desire to limit myself to the precise construction and combination of devices herein shown and described, as it is evident that modifications may be made therein without departing from the spirit of my invention and within the scope of the appended claims.

Having thus fully described my invention, what I claim as new, and desire to secure by Letters Patent, is—

1. In a device of the class described, the combination of a burner, a gas-receiver, having an element movable by gas-pressure, a seal vessel detachably secured to and opening into the gas-receiver, a gas-conducting element carried by said movable element and operating in the seal vessel, and a flexible gas-conducting tube connected to the said gas-conducting element and to the burner, substantially as described.

2. In a device of the class described, the combination of a gas-receiver having a seal vessel and a diaphragm, a gas-conducting element carried by the diaphragm and coacting with the seal vessel to control the flow of gas from the receiver, a burner, and a flexible gas-conducting tube connecting the burner and said gas-conducting element, substantially as described.

3. In a device of the class described, the combination of a gas-receiver having a seal-chamber and an element movable by gas-pressure, a burner, a support therefor, a gas-conducting element movable with the said movable element and coacting with the said seal-chamber to control the flow of gas from the receiver, a gas-conductor between said gas-conducting element and the burner, and a gas-igniting device including a movable element connected to and automatically operated by the movable element of the gas-receiver, substantially as described.

In testimony whereof I have signed my name to this specification in presence of two witnesses.

CHARLES THERON WILLSON.

Witnesses:
GEORGE T. WILLSON,
F. P. HAMM.